US012811172B2

(12) United States Patent
Minegishi et al.

(10) Patent No.: US 12,811,172 B2
(45) Date of Patent: Nov. 24, 2026

(54) FUEL CELL SYSTEM

(71) Applicant: TOYOTA JIDOSHA KABUSHIKI KAISHA, Toyota (JP)

(72) Inventors: Shinichiro Minegishi, Toyota (JP); Shuji Kawamura, Toyota (JP); Junichi Matsuo, Okazaki (JP); Junichi Oura, Okazaki (JP); Sota Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 454 days.

(21) Appl. No.: 18/408,155

(22) Filed: Jan. 9, 2024

(65) Prior Publication Data

US 2024/0313245 A1 Sep. 19, 2024

(30) Foreign Application Priority Data

Mar. 16, 2023 (JP) ................................ 2023-041710

(51) Int. Cl.
*H01M 8/04858* (2016.01)
*H01M 8/04537* (2016.01)

(52) U.S. Cl.
CPC ..... *H01M 8/0488* (2013.01); *H01M 8/04559* (2013.01); *H01M 8/04589* (2013.01); *H01M 8/0494* (2013.01)

(58) Field of Classification Search
CPC ........... H01M 8/0488; H01M 8/04559; H01M 8/04589; H01M 8/0494; H01M 2250/20; H01M 8/04; H01M 8/04373; H01M 8/04544; H01M 8/04574; H01M 8/04992; H01M 8/04947; H01M 8/04567; H01M 8/04597; H01M 8/04738; Y02E 60/50; H02M 1/327; H02M 1/0009; H02M 1/0025; H02M 1/08
See application file for complete search history.

(56) References Cited

U.S. PATENT DOCUMENTS

2019/0305710 A1* 10/2019 Tanahashi ......... H02M 7/53871
2021/0188103 A1* 6/2021 Ichikawa ................ B60L 50/75
(Continued)

FOREIGN PATENT DOCUMENTS

JP 2011023132 A 2/2011

*Primary Examiner* — Jue Zhang
*Assistant Examiner* — Jared Raymond Hausman
(74) *Attorney, Agent, or Firm* — Hunton Andrews Kurth LLP

(57) ABSTRACT

A fuel cell system includes a sensor. The controller decides a continuous rated electric power. The controller sets a time rated electric power as a final upper limit electric power when the time rated electric power is higher than the continuous rated electric power and is lower than an instantaneous upper limit electric power, and sets the instantaneous upper limit electric power as the final upper limit electric power when the time rated electric power is higher than the continuous rated electric power and is higher than the instantaneous upper limit electric power. When the time rated electric power is lower than the continuous rated electric power, the continuous rated electric power is set as the final upper limit electric power. The controller controls one of the boost converter and an FC such that the output of the boost converter does not exceed the final upper limit electric power.

1 Claim, 3 Drawing Sheets

(56) References Cited

U.S. PATENT DOCUMENTS

| | | | | |
|---|---|---|---|---|
| 2021/0351424 | A1* | 11/2021 | Oya | B60L 1/003 |
| 2021/0367246 | A1* | 11/2021 | Ogawa | H01M 8/0432 |
| 2022/0278544 | A1* | 9/2022 | Maeda | B60L 15/20 |

* cited by examiner

FUEL CELL SYSTEM

CROSS-REFERENCE TO RELATED APPLICATION

This application claims priority to Japanese Patent Application No. 2023-041710 filed on Mar. 16, 2023, incorporated herein by reference in its entirety.

BACKGROUND

1. Technical Field

Technologies disclosed in the present specification relate to a fuel cell system that includes a fuel cell and a boost converter.

2. Description of Related Art

Japanese Unexamined Patent Application Publication No. 2011-23132 (JP 2011-23132 A) discloses a fuel cell system that includes a fuel cell and a boost converter. For preventing the overheating of the boost converter, the output of the boost converter is decreased when the temperatures of some capacitors included in the boost converter are equal to or higher than a threshold.

SUMMARY

The technology in JP 2011-23132 A requires a temperature sensor that measures the temperature of the capacitor. When the number of capacitors included in the boost converter increases, it is necessary to include a plurality of temperature sensors. The present specification provides a technology for preventing the overheating of the boost converter without including the temperature sensor. Further, generally, for an electric device, a continuous rated electric power specifying the maximum electric power that allows continuous operation to be performed for one hour or more is prescribed. However, in the case of a short time, the overheating does not occur even when the electric power exceeds the continuous rated electric power. The present specification also provides a technology for allowing an output exceeding the continuous rated electric power for a short time depending on the situation.

An embodiment of a fuel cell system disclosed in the present specification includes: a fuel cell; a boost converter that boosts an output voltage of the fuel cell and outputs the output voltage to a predetermined load device; a voltage sensor; a current sensor: a controller that controls the boost converter based on measured values of the current sensor and the voltage sensor. The voltage sensor measures an input voltage to the boost converter. The current sensor measures an input current to the boost converter.

In the controller, the following data is previously stored.

(1) A continuous rated electric power that is an upper limit that allows the boost converter to continuously perform output for one hour or more.

(2) An instantaneous upper limit electric power that is an upper limit that allows the boost converter to perform output from a standpoint of component protection.

(3) A first current-temperature correspondence relation by which an estimated temperature of a component (this component is referred to as "pre-boost component") is evaluated from a measured value of the current sensor, the pre-boost component being a conductive component that connects the boost converter and the fuel cell and through which current from the fuel cell flows.

(4) A first temperature-limit correspondence relation by which an input current limit of the boost converter is evaluated from the estimated temperature of the pre-boost component.

(5) A second current-temperature correspondence relation by which an estimated temperature of a component (this component is referred to as "post-boost component") is evaluated from measured values of the current sensor and the voltage sensor, the post-boost component being a conductive component that connects the boost converter and the load device and through which current from the boost converter flows.

(6) A second temperature-limit correspondence relation by which an output current limit of the boost converter is evaluated from the estimated temperature of the post-boost component.

(7) A time rated correspondence relation by which a time rated electric power is evaluated from the input current limit and the output current limit, the time rated electric power being an electric power that allows the boost converter to continuously perform output for equal to or less than one hour.

The above data is previously obtained by simulations or experiments. The above correspondence relations may be indicated by mathematical expressions, or may be indicated by maps.

The controller decides a final upper limit electric power for the boost converter, using measured values of the current sensor and the voltage sensor and the above data. The controller controls the boost converter such that an output electric power of the boost converter does not exceed the final upper limit electric power.

A final upper limit electric power decision process that is executed by the controller is as follows.

(1) The controller evaluates the estimated temperature of the pre-boost component, using the measured value of the current sensor and the first current-temperature correspondence relation.

(2) The controller evaluates the estimated temperature of the post-boost component, using the measured values of the current sensor and the voltage sensor and the second current-temperature correspondence relation.

(3) The controller evaluates the input current limit, using the obtained estimated temperature of the pre-boost component and the first temperature-limit correspondence relation.

(4) The controller evaluates the output current limit, using the obtained estimated temperature of the post-boost component and the second temperature-limit correspondence relation.

(5) The controller evaluates the time rated electric power, using the obtained input current limit, the obtained output current limit, and the time rated correspondence relation.

(6) The controller sets the time rated electric power as the final upper limit electric power, when the obtained time rated electric power is higher than the continuous rated electric power and is lower than the instantaneous upper limit electric power.

(7) The controller sets the instantaneous upper limit electric power as the final upper limit electric power, when the obtained time rated electric power is higher than the continuous rated electric power and is higher than the instantaneous upper limit electric power.

(8) The controller sets the continuous rated electric power as the final upper limit electric power, when the obtained time rated electric power is lower than the continuous rated electric power.

The fuel cell system disclosed in the present specification can prevent the overheating of the boost converter without using a temperature sensor. Moreover, the final upper limit electric power for preventing the overheating is changed depending on the situation, and therefore it is possible to efficiently use the boost converter.

Details of the technologies disclosed in the present specification and further improvements will be described in "DETAILED DESCRIPTION OF EMBODIMENTS" shown later.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A fuel cell system 2 in an embodiment will be described with reference to the drawings. Hereinafter, for simplifying the description, "fuel cell" is occasionally referred to as "FC". The "fuel cell system 2" is referred to as "FC system 2", and "fuel cell stack" is referred to as "FC stack".

Figure 1:
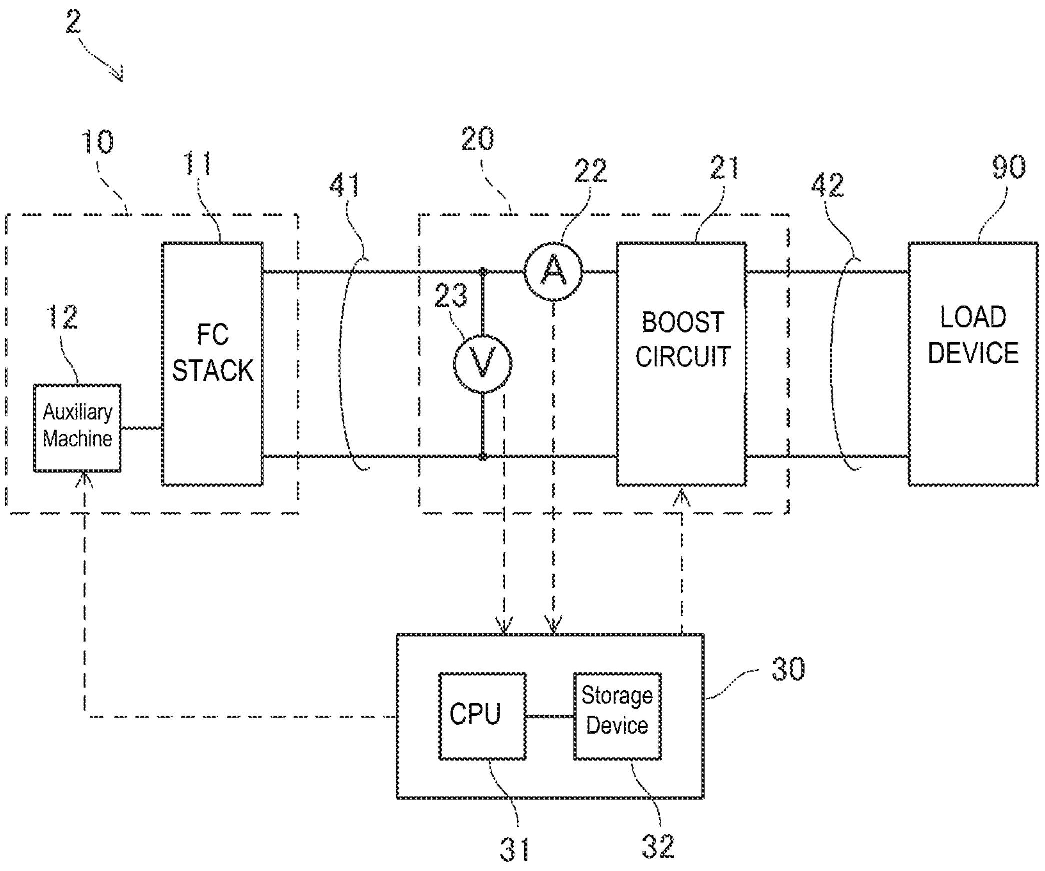
FIG. 1 is a block diagram of a fuel cell system in an embodiment.

FIG. 1 shows a block diagram of the FC system 2. The FC system 2 includes an FC 10 (fuel cell 10), a boost converter 20, and a controller 30. The FC 10 includes an FC stack 11 that generates electric power, and an auxiliary machine 12 for operating the FC stack 11. The "auxiliary machine" in the embodiment is a collective term of all devices necessary for operating the FC stack 11, as exemplified by a fuel tank, a compressor, and an injector.

An output terminal of the FC stack 11 is connected to an input terminal of the boost converter 20 through an input cable 41. The boost converter 20 includes a current sensor 22 that measures an input current, a voltage sensor 23 that measures an input voltage, and a boost circuit 21 that boosts the voltage of input electric power and outputs the electric power. The boost circuit 21 may be a conduction type boost circuit that is constituted by a coil, a switching element, and a capacitor, or may be a non-conduction type boost circuit in which a transformer is used.

An output terminal (an output terminal of the boost converter 20) of the boost circuit 21 is connected to a load device 90 through an output cable 42. The load device 90 is a device that consumes electric power, or a device that stores electric power. Specific examples of the load device 90 include an electric motor (the device that consumes electric power) and a battery (the device that stores electric power), and the like.

Measured values of the current sensor 22 and the voltage sensor 23 are sent to the controller 30. The controller 30 controls the boost converter 20 (boost circuit 21) and the FC 10 (auxiliary machine 12), based on the measured values of the current sensor 22 and the voltage sensor 23.

The controller 30 includes a storage device 32 that stores a program and a variety of data, and a central processing unit 31 (CPU 31) that executes the program stored in the storage device 32. The program that is executed by the controller 30 (CPU 31) is a program for a process (overheating prevention process) of controlling the boost converter 20 (boost circuit 21) and the FC 10 (auxiliary machine 12), such that the output electric power of the boost converter 20 (boost circuit 21) does not exceed a final upper limit electric power. In the overheating prevention process, the controller 30 appropriately sets the final upper limit electric power based on the measured values of the current sensor 22 and the voltage sensor 23.

The storage device 32 stores a variety of data for deciding the final upper limit electric power, in addition to the program for the overheating prevention process. The storage device 32 stores the following data.

(1) A continuous rated electric power that is an upper limit that allows the boost converter to continuously perform output for one hour or more. In other words, the continuous rated electric power is a constant that prescribes an upper limit electric power that the boost converter may continuously output for one hour or more. 30

(2) An instantaneous upper limit electric power that is an upper limit that allows the boost converter to perform output from a standpoint of component protection.

(3) A first current-temperature correspondence relation by which an estimated temperature of a component (this component is referred to as "pre-boost component") is evaluated from a measured value of the current sensor, the pre-boost component being a conductive component that connects the boost converter and the fuel cell and through which current from the fuel cell flows.

(4) A first temperature-limit correspondence relation by which an input current limit of the boost converter is evaluated from the estimated temperature of the pre-boost component.

(5) A second current-temperature correspondence relation by which an estimated temperature of a component (this component is referred to as "post-boost component") is evaluated from measured values of the current sensor and the voltage sensor, the post-boost component being a conductive component that connects the boost converter and the load device and through which current from the boost converter flows.

(6) A second temperature-limit correspondence relation by which an output current limit of the boost converter is evaluated from the estimated temperature of the post-boost component.

(7) A time rated correspondence relation by which a time rated electric power is evaluated from the input current limit and the output current limit. The time rated electric power is a variable that prescribes an upper limit electric power that allows the boost converter to continuously perform output for equal to or less than one hour. In other words, the time rated electric power is the value of an upper limit electric power that the boost converter may continuously output for equal to or less than one hour.

The variety of correspondence relation data described above is previously obtained by simulations or experiments. The above correspondence relation may be given as mathematical expressions, or may be given as maps.

Figure 2:
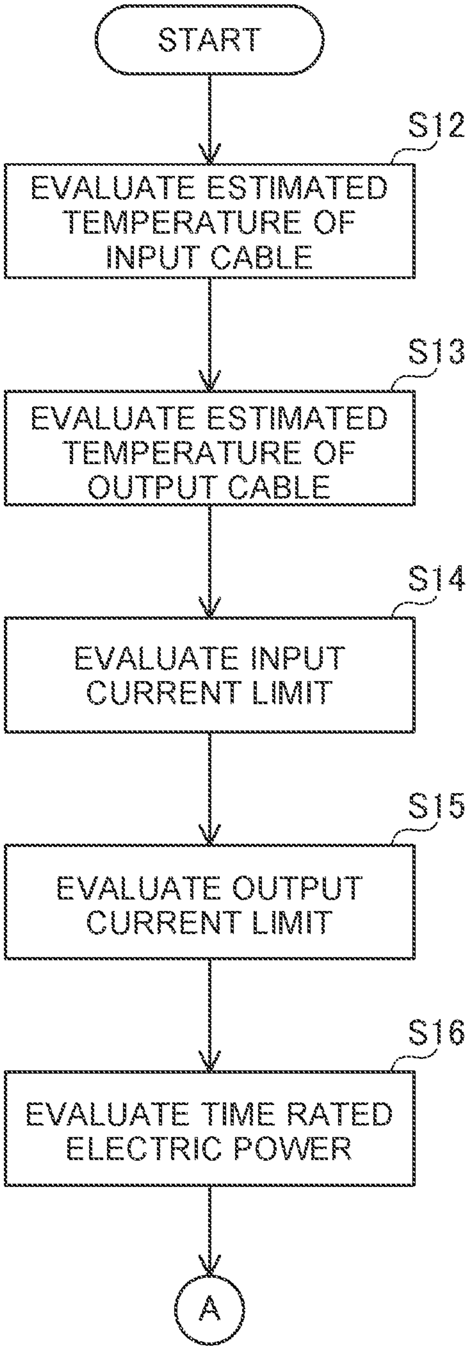
FIG. 2 is a flowchart of an overheating prevention process that is executed by a controller.
Figure 3:
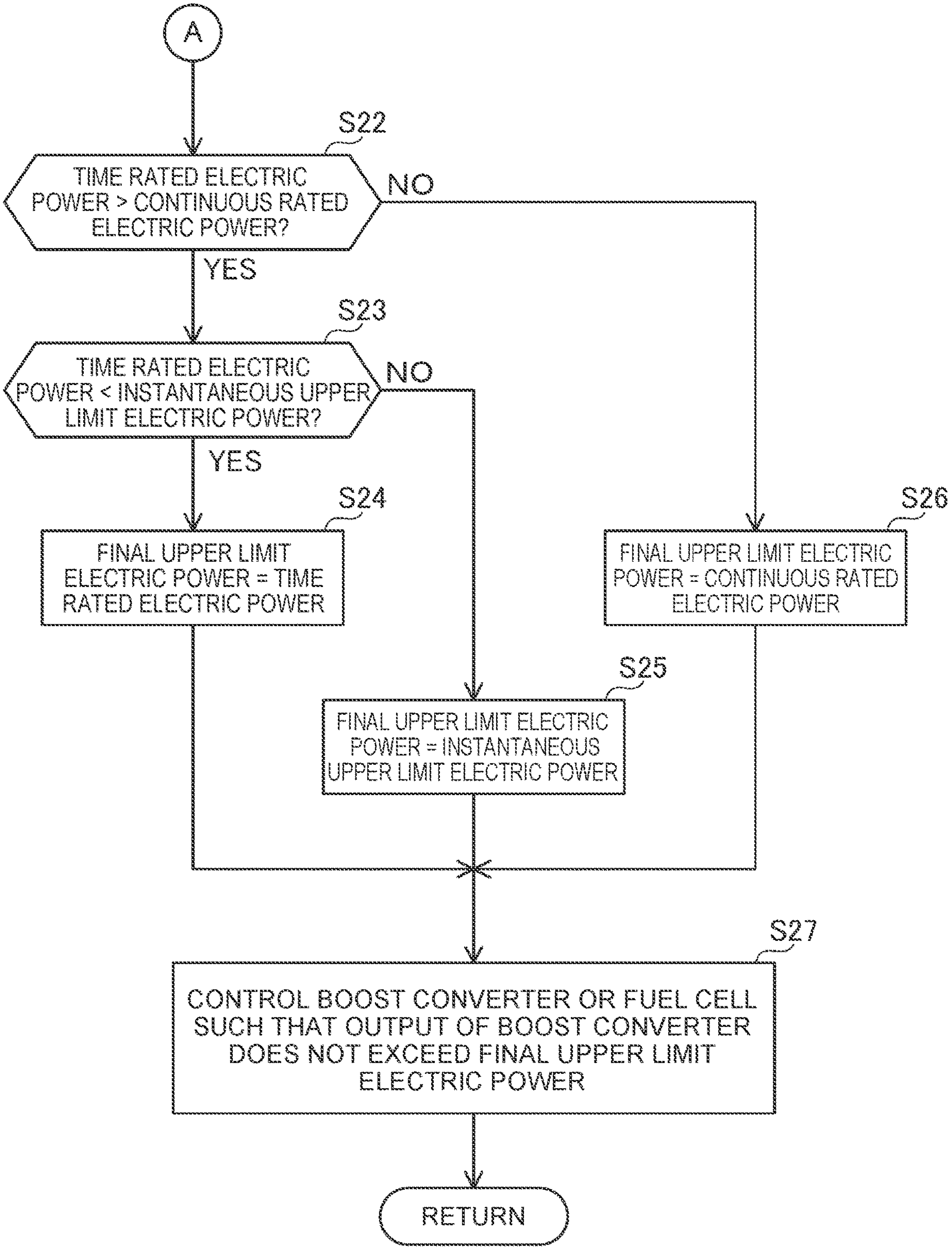
FIG. 3 is a flowchart of the overheating prevention process (continued from FIG. 2).

FIG. 2 and FIG. 3 show flowcharts of the overheating prevention process for the boost converter 20. The overheating prevention process will be described below with reference to FIG. 2 and FIG. 3.

The controller 30 evaluates the estimated temperature of the input cable 41, using the measured value of the current sensor 22 and the first current-temperature correspondence relation (step S12). When current flows through the input cable 41, heat is generated by the internal resistance of the input cable 41. Further, some of the heat of the input cable 41 is dispersed to components (a protective tube and a terminal block that are made of resin) that contact with the input cable. Alternatively, some of the heat of the input cable 41 is dispersed to the air. The generated heat amount and the dispersed heat amount depend on the physical characteristic of the cable and the physical structure of the periphery of the cable. Accordingly, a constant relation is satisfied between the current that flows through the input cable 41 and the temperature of the input cable 41. The relation is formulated (or mapped) by simulations or experiments, so that the first current-temperature correspondence relation is obtained. The controller 30 refers to the first current-temperature correspondence relation, and obtains the estimated temperature of the input cable 41 with respect to the measured value of the current sensor 22.

Subsequently, the controller 30 evaluates the estimated temperature of the output cable 42, using the measured values of the current sensor 22 and the voltage sensor 23 and the second current-temperature correspondence relation (step S13). The temperature of the output cable 42 depends on the electric power after the boost. The electric power after the boost is nearly equal to the electric power before the boost. The second current-temperature correspondence relation is obtained by previously formulating (or mapping) the relation between the electric power before the input (that is, the product of the measured values of the current sensor 22 and the voltage sensor 23) and the temperature of the output cable 42. The controller 30 evaluates the estimated temperature of the output cable 42, using the second current-temperature correspondence relation.

Subsequently, the controller 30 evaluates the input current limit of the boost converter 20, using the estimated temperature of the input cable 41 that is obtained in step S12 and the first temperature-limit correspondence relation (step S14). In the first temperature-limit correspondence relation, the relation between the estimated temperature and the input current limit is prescribed such that the input current limit is lower as the estimated temperature is higher.

Subsequently, the controller 30 evaluates the output current limit of the boost converter 20, using the estimated temperature of the output cable 42 that is obtained in step S13 and the second temperature-limit correspondence relation (step S15). In the second temperature-limit correspondence relation, the relation between the estimated temperature and the output current limit is prescribed such that the output current limit is lower as the estimated temperature is higher.

The controller 30 evaluates the time rated electric power of the boost converter 20, using the input current limit obtained in step S14, the output current limit obtained in step S15, and the time rated correspondence relation (step S16). The "time rated electric power" means the upper limit of an output electric power at which the overheating does not occur even when the boost converter continuously performs output for equal to or less than one hour. In the time rated correspondence relation, the relation between the product of the input current limit and the output current limit and the time rated electric power is prescribed such that the time rated electric power is higher as the product of the input current limit and the output current limit is larger.

Subsequently, the controller 30 compares the time rated electric power obtained in step S16 and the continuous rated electric power stored in the storage device 32 (step S22). In the case where the time rated electric power is higher than the continuous rated electric power, the controller 30 compares the time rated electric power and the instantaneous upper limit electric power stored in the storage device 32 (step S22: YES, S23). In the case where the time rated electric power is lower than the instantaneous upper limit electric power, the controller 30 sets the time rated electric power as the final upper limit electric power (step S23: YES, S24). The "final upper limit electric power" is a variable that is defined in the overheating prevention process, and is decided in one of step S24, step S25, and step S26.

In the case where the time rated electric power is lower than the instantaneous upper limit electric power in the determination in step S23 (step S23: YES), the controller 30 sets the time rated electric power as the final upper limit electric power (step S24). In the case where the time rated electric power is higher than the instantaneous upper limit electric power in the determination in step S23 (step S23: NO), the controller 30 sets the instantaneous upper limit electric power as the final upper limit electric power (step S25).

In the case where the time rated electric power is lower than the continuous rated electric power in step S22 (step S22: NO), the controller 30 sets the continuous rated electric power as the final upper limit electric power (step S26).

After the final upper limit electric power is decided in one of step S24, step S25, and step S26, the controller 30 controls the boost converter 20 and/or the FC 10, such that the output electric power of the boost converter 20 does not exceed the final upper limit electric power (step S27). Specifically, the controller 30 decreases the boost rate of the boost converter 20, when the output of the boost converter 20 is close to the final upper limit electric power. Alternatively, the controller 30 controls the auxiliary machine 12, to decrease the output of the FC stack 11. The controller 30 controls the FC 10 such that the input current to the boost converter 20 does not exceed the input current limit obtained in step S14. Further, the controller 30 controls the boost converter 20 such that the output current of the boost converter 20 does not exceed the output current limit obtained in step S15.

By the above process, the output electric power of the boost converter 20 does not exceed the final upper limit electric power, so that the overheating is prevented.

The FC system 2 can prevent the overheating of the boost converter 20 without using a temperature sensor. Further, the FC system 2 adjusts the final upper limit electric power of the boost converter 20 depending on the measured values of the current sensor 22 and the voltage sensor 23. Accordingly, it is possible to effectively use the boost converter 20.

The process in FIG. 2 and FIG. 3 can be briefly summarized as follows. The controller 30 decides the continuous rated electric power based on the input current and input electric power of the boost converter 20 (steps S12-S16). The correspondence relation by which the continuous rated electric power is evaluated from the input current and the input voltage is previously stored in the controller 30.

Next, the controller 30 compares the continuous rated electric power and the time rated electric power (step S22). When the time rated electric power is higher than the continuous rated electric power (step S22: YES), the controller 30 compares the time rated electric power and the instantaneous upper limit electric power (step S23). When the time rated electric power is lower than the instantaneous upper limit electric power (step S23: YES), the controller 30 sets the time rated electric power as the final upper limit electric power (step S24). On the other hand, when the time rated electric power is higher than the instantaneous upper limit electric power (step S23: NO), the controller 30 sets the instantaneous upper limit electric power as the final upper limit electric power (step S25).

Further, when the time rated electric power is lower than the continuous rated electric power in the process of step S22 (step S22: NO), the controller 30 sets the continuous rated electric power as the final upper limit electric power (step S26). Then, the controller 30 controls at least one of the boost converter 20 and the FC 10 such that the output of the boost converter 20 does not exceed the final upper limit electric power (step S27).

Notes relevant to the technologies described in the embodiment will be described. The input cable 41 corresponds to an example of the pre-boost component that connects the boost converter 20 and the FC 10. The output cable 42 corresponds to an example of the post-boost component that connects the boost converter 20 and the load device 90. The pre-boost component only needs to be a component through which the output current of the FC 10 flows, and may be a terminal or a relay, instead of the input cable. The post-boost component only needs to be a component through which the output current of the boost converter 20 flows, and may be a terminal or a relay, instead of the output cable.

Specific examples of the present disclosure have been described above in detail. They are just examples, and do not limit the scope of the claims. The technologies described in the claims include various modifications and alterations of the above-exemplified specific examples. The technical elements described in the present specification or the drawings exert technical utility independently or by various combinations, and are not limited to the combinations described in the claims at the filing time. Further, the technologies exemplified in the present specification or the drawings can concurrently achieve a plurality of purposes, and have technical utility simply by achieving one of the plurality of purposes.

What is claimed is:

1. A fuel cell system comprising:

a fuel cell;

a boost converter that boosts an output voltage of the fuel cell and outputs the output voltage to a predetermined load device;

a voltage sensor that measures an input voltage to the boost converter;

a current sensor that measures an input current to the boost converter; and a controller that controls the boost converter, wherein:

the controller stores a continuous rated electric power that is an upper limit that allows the boost converter to continuously perform output for one hour or more, an instantaneous upper limit electric power that is an upper limit that allows the boost converter to perform output from a standpoint of component protection, a first current-temperature correspondence relation by which an estimated temperature of a pre-boost component is evaluated from a measured value of the current sensor, the pre-boost component being a conductive component that connects the boost converter and the fuel cell and through which current from the fuel cell flows, a first temperature-limit correspondence relation by which an input current limit of the boost converter is evaluated from the estimated temperature of the pre-boost component, a second current-temperature correspondence relation by which an estimated temperature of a post-boost component is evaluated from measured values of the current sensor and the voltage sensor, the post-boost component being a conductive component that connects the boost converter and the load device and through which current from the boost converter flows, a second temperature-limit correspondence relation by which an output current limit of the boost converter is evaluated from the estimated temperature of the post-boost component, and a time rated correspondence relation by which a time rated electric power is evaluated from the input current limit and the output current limit, the time rated electric power being an electric power that allows the boost converter to continuously perform output for equal to or less than one hour;

the controller evaluates the estimated temperature of the pre-boost component, using the measured value of the current sensor and the first current-temperature correspondence relation;

the controller evaluates the estimated temperature of the post-boost component, using the measured values of the current sensor and the voltage sensor and the second current-temperature correspondence relation;

the controller evaluates the input current limit, using the obtained estimated temperature of the pre-boost component and the first temperature-limit correspondence relation;

the controller evaluates the output current limit, using the obtained estimated temperature of the post-boost component and the second temperature-limit correspondence relation;

the controller evaluates the time rated electric power, using the obtained input current limit, the obtained output current limit, and the time rated correspondence relation;

the controller sets the time rated electric power as a final upper limit electric power, when the obtained time rated electric power is higher than the continuous rated electric power and is lower than the instantaneous upper limit electric power;

the controller sets the instantaneous upper limit electric power as the final upper limit electric power, when the obtained time rated electric power is higher than the continuous rated electric power and is higher than the instantaneous upper limit electric power;

the controller sets the continuous rated electric power as the final upper limit electric power, when the obtained time rated electric power is lower than the continuous rated electric power; and the controller controls the boost converter such that an output electric power of the boost converter does not exceed the final upper limit electric power.

* * * * *